(12) United States Patent
Endo et al.

(10) Patent No.: US 12,084,125 B2
(45) Date of Patent: Sep. 10, 2024

(54) ELECTRIC POWER STEERING APPARATUS, CONTROL DEVICE USED IN ELECTRIC POWER STEERING APPARATUS, AND CONTROL METHOD

(71) Applicant: Nidec Corporation, Kyoto (JP)

(72) Inventors: Shuji Endo, Kyoto (JP); Hiroyuki Ishimura, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 317 days.

(21) Appl. No.: 17/632,836

(22) PCT Filed: Aug. 6, 2020

(86) PCT No.: PCT/JP2020/030251
§ 371 (c)(1),
(2) Date: Feb. 4, 2022

(87) PCT Pub. No.: WO2021/029328
PCT Pub. Date: Feb. 18, 2021

(65) Prior Publication Data
US 2022/0266894 A1 Aug. 25, 2022

(30) Foreign Application Priority Data

Aug. 9, 2019 (JP) ................................ 2019-147869

(51) Int. Cl.
*B62D 5/04* (2006.01)
*B62D 6/00* (2006.01)
*B62D 6/10* (2006.01)

(52) U.S. Cl.
CPC ......... *B62D 5/0463* (2013.01); *B62D 5/0409* (2013.01); *B62D 5/0424* (2013.01); *B62D 6/007* (2013.01); *B62D 6/10* (2013.01)

(58) Field of Classification Search
CPC ...... B62D 5/04; B62D 5/0409; B62D 5/0421; B62D 5/0424; B62D 5/046; B62D 5/0463; B62D 6/007; B62D 6/008; B62D 6/10
(Continued)

(56) References Cited

U.S. PATENT DOCUMENTS 6,134,490 A  10/2000 Ito et al.
8,573,352 B2  11/2013 Oniwa et al.
(Continued)

FOREIGN PATENT DOCUMENTS

CN  102398602 A  4/2012
DE  101 56 369 A1  5/2002
(Continued)

OTHER PUBLICATIONS

Official Communication issued in International Patent Application No. PCT/JP2020/030251 mailed on Oct. 20, 2020.
(Continued)

*Primary Examiner* — Erick R Solis
(74) *Attorney, Agent, or Firm* — Keating & Bennett, LLP

(57) ABSTRACT

A processor acquires a steering torque detected by a steering torque sensor and a vehicle speed detected by a vehicle speed sensor, changes a gain and a phase to be applied to the steering torque in accordance with a steering frequency when a driver steers a steering wheel, determines a magnitude of an assist torque based on the steering torque to which the gain and the phase have been applied and the vehicle speed, and generates a torque command value to be used to control driving of the motor based on the determined assist torque.

9 Claims, 9 Drawing Sheets

(58) Field of Classification Search
USPC .............................................. 701/41, 42, 44
See application file for complete search history.

(56) References Cited

U.S. PATENT DOCUMENTS

| | | | |
|---|---|---|---|
| 9,079,602 B2 | 7/2015 | Konomi et al. | |
| 2002/0043423 A1 | 4/2002 | Endo et al. | |
| 2002/0060538 A1 | 5/2002 | Hara et al. | |
| 2012/0062375 A1 | 3/2012 | Takeuchi et al. | |
| 2019/0039647 A1* | 2/2019 | Tsubaki | B62D 6/007 |
| 2019/0263446 A1* | 8/2019 | Tsubaki | B62D 6/00 |
| 2019/0300044 A1* | 10/2019 | Tsubaki | B62D 5/04 |
| 2020/0102003 A1 | 4/2020 | Ishimura et al. | |
| 2023/0278630 A1* | 9/2023 | Ono | B62D 15/025 |
| | | | 701/41 |

FOREIGN PATENT DOCUMENTS

| | | |
|---|---|---|
| DE | 101 42 154 B4 | 11/2005 |
| DE | 199 19 374 B4 | 9/2007 |
| DE | 10 2019 214 894 A1 | 4/2020 |
| JP | 2008-114687 A | 5/2008 |
| JP | 4134646 B2 | 8/2008 |
| JP | 6131208 B2 | 5/2017 |

OTHER PUBLICATIONS

Wikipedia—Artikel Steuergerat, https://de.wikipedia.org/w/index.php?title=Steuergerät&oldid=181241123, edited on Sep. 26, 2018, pp. 1-4.

Official Communication issued in corresponding Chinese Patent Application No. 202080056200.2, mailed on Apr. 14, 2023.

* cited by examiner

ELECTRIC POWER STEERING APPARATUS, CONTROL DEVICE USED IN ELECTRIC POWER STEERING APPARATUS, AND CONTROL METHOD

CROSS-REFERENCE TO RELATED APPLICATIONS

This is a U.S. national stage of application No. PCT/JP2020/030251, filed on Aug. 6, 2020, and priority under 35 U.S.C. § 119(a) and 35 U.S.C. § 365(b) is claimed from Japanese Patent Application No. 2019-147869, filed on Aug. 9, 2019, the entire disclosures of which are hereby incorporated herein by reference.

1. FIELD OF THE INVENTION

The present disclosure relates to an electric power steering apparatus, a control device used in the electric power steering apparatus, and a control method.

2. BACKGROUND

An automobile equipped with an electric power steering apparatus (EPS) including an electric motor (hereinafter, referred to simply as a "motor") has been widely used. The electric power steering apparatus is an apparatus that assists a driver's steering wheel operation by driving the motor. A steering wheel is also referred to as a handle in some cases.

In recent years, it has been required that an assist force of the electric power steering apparatus with respect to steering by the driver has different steering characteristics depending on a vehicle type. In addition, even for the same vehicle type, it has been required to provide different steering characteristics depending on gender, age, driving experience, a driving situation, and the like. As one of techniques for improving a driver's steering feeling, conventionally, a technique of performing larger lag phase compensation on a torque signal as a steering angle increases is known.

There is a demand for improvement of a steering feeling suitable for various driving situations.

SUMMARY

According to an example embodiment of the present disclosure, a control device usable in an electric power steering apparatus including a motor to control driving of the motor, includes a processor and a memory to store a program to control an operation of the processor and cause the processor to acquire a steering torque detected by a steering torque sensor and a vehicle speed detected by a vehicle speed sensor, change a gain and a phase to be applied to the steering torque in accordance with a steering frequency when a driver steers a steering wheel, determine a magnitude of an assist torque based on the steering torque to which the gain and the phase have been applied and the vehicle speed, and generate a torque command value to be used to control driving of the motor based on the determined assist torque.

According to another example embodiment of the present disclosure, a control method, usable in an electric power steering apparatus including a motor to control driving of the motor, includes acquiring a steering torque detected by a steering torque sensor and a vehicle speed detected by a vehicle speed sensor, changing a gain and a phase to be applied to the steering torque in accordance with a steering frequency when a driver steers a steering wheel, determining a magnitude of an assist torque based on the steering torque to which the gain and the phase have been applied and the vehicle speed, and generating a torque command value to be used to control driving of the motor based on the determined assist torque.

The above and other elements, features, steps, characteristics and advantages of the present disclosure will become more apparent from the following detailed description of the example embodiments with reference to the attached drawings.

DETAILED DESCRIPTION

As described above, as one of the techniques for improving a driver's steering feeling, there is a technique of performing larger lag phase compensation on a torque signal as a steering angle increases. However, such a technique is advantageous in a situation where a gentle operational feeling is required, such as a case where a comfort mode is selected as a driving mode, but is not suitable for a situation where an agile operational feeling is required, such as a sport mode.

In recent years, there has been a demand not only for a steering load felt by a driver, such as "heavy" or "light", but also for agility, such as a vehicle reacting "gently" or "quickly" with respect to steering. In particular, there is a demand for steering characteristics such as "reacting quickly when the steering load is heavy" and "reacting gently when the steering load is light". Example embodiments of the present disclosure provide such steering characteristics.

With reference to the accompanying drawings, hereinafter, a specific description will be given of control devices and control methods for electric power steering apparatuses according to example embodiments of the present disclosure as well as electric power steering apparatuses including the control devices. However, a specific description more than necessary will not be given in some cases. For example, detailed descriptions of well-known matters and duplicate description of substantially the same configuration may be omitted. This is to avoid unnecessary redundancy of the following description and to facilitate the understanding of those skilled in the art.

The following example embodiments are illustrative, and the control device and the control method for an electric power steering apparatus according to the present disclosure are not limited to the following example embodiments. For example, the numerical values, the steps, the order of the steps, and the like illustrated in the following example embodiments are only illustrative, and various modifications can be made unless any technical inconsistency occurs. The example embodiments to be described below are illustrative, and various combinations are possible unless any technical inconsistency occurs.

Figure 1:
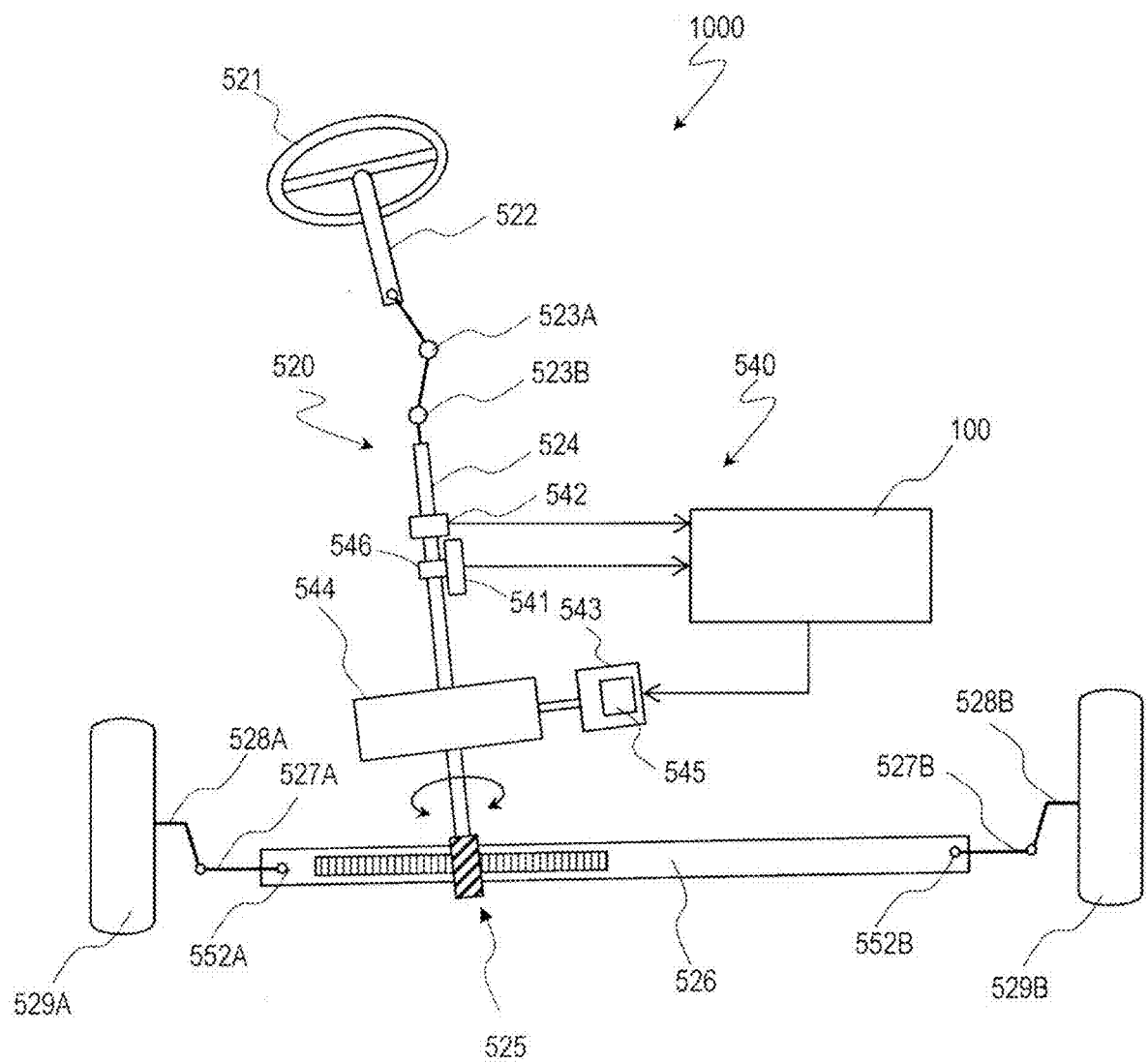
FIG. 1 schematically illustrates a configuration example of an electric power steering apparatus according to an example embodiment of the present disclosure.

FIG. 1 is a diagram schematically illustrates a configuration example of an electric power steering apparatus 1000 according to the present example embodiment.

The electric power steering apparatus 1000 (hereinafter, referred to as an "EPS") includes a steering system 520 and an assist torque mechanism 540 which generates an assist torque. The EPS 1000 generates the assist torque for assisting a steering torque of the steering system generated when a driver operates a steering wheel. The assist torque reduces an operation load on the driver.

The steering system 520 includes, for example, a steering wheel 521, a steering shaft 522, universal joints 523A and 523B, a rotating shaft 524, a rack and pinion mechanism 525, a rack shaft 526, left and right ball joints 552A and 552B, tie rods 527A and 527B, knuckles 528A and 528B, and left and right steered wheels 529A and 529B.

The assist torque mechanism 540 includes a steering torque sensor 541, a steering angle sensor 542, an electronic control unit (ECU) 100 for automobiles, a motor 543, a deceleration gear 544, an inverter 545, and a torsion bar 546, for example. The steering torque sensor 541 detects a steering torque in the steering system 520 by detecting the amount of torsion of the torsion bar 546. The steering angle sensor 542 detects a steering angle of the steering wheel.

The ECU 100 generates a motor driving signal based on the detection signals detected by the steering torque sensor 541, the steering angle sensor 542, a vehicle speed sensor (not illustrated) mounted on a vehicle, or the like, and outputs the motor driving signal to the inverter 545. For example, the inverter 545 converts direct-current power into three-phase alternating-current power having A-phase, B-phase, and C-phase pseudo sine waves in accordance with the motor driving signal and supplies the power to the motor 543. The motor 543 is, for example, a surface permanent-magnet synchronous motor (SPMSM) or a switched reluctance motor (SRM), and is supplied with the three-phase alternating-current power to generate an assist torque corresponding to the steering torque. The motor 543 transmits the generated assist torque to the steering system 520 via the deceleration gear 544. Hereinafter, the ECU 100 will be referred to as a control device 100 for the EPS.

Figure 2:
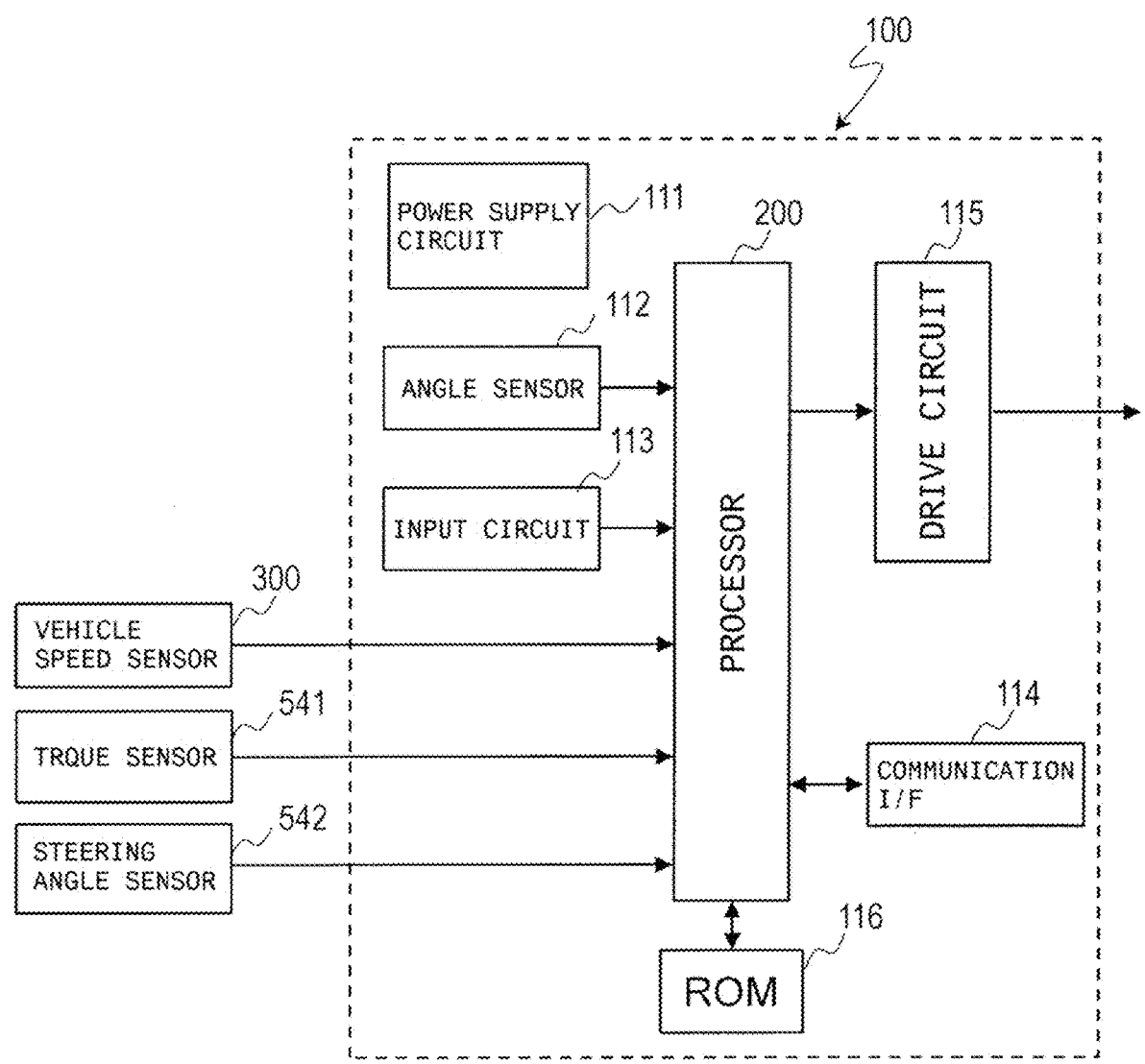
FIG. 2 is a block diagram illustrating a configuration example of a control device according to an example embodiment of the present disclosure.

FIG. 2 is a block diagram illustrating a typical example of a configuration of the control device 100 according to the present example embodiment. The control device 100 includes a power supply circuit 111, an angle sensor 112, an input circuit 113, a processor 200, a communication I/F 114, a drive circuit 115, a ROM 116, for example. The control device 100 can be realized as a printed circuit board (PCB) on which these electronic components are implemented.

A vehicle speed sensor 300 mounted on the vehicle, the steering torque sensor 541, and the steering angle sensor 542 are electrically connected to the processor 200. The vehicle speed sensor 300, the steering torque sensor 541, and the steering angle sensor 542 transmit a vehicle speed v, a steering torque $T_{tor}$, and a steering angle θ to the processor 200, respectively.

The control device 100 is electrically connected to the inverter 545. The control device 100 controls switching operations of a plurality of switch elements (for example, MOSFETs) included in the inverter 545. Specifically, the control device 100 generates control signals (hereinafter referred to as "gate control signals") for controlling the switching operations of the respective switch elements and outputs the gate control signals to the inverter 545.

The control device 100 generates a torque command value based on the vehicle speed v, the steering torque $T_{tor}$, and a steering angle θ, and the like, and controls a torque and a rotational speed of the motor 543 by, for example, vector control. The control device 100 can perform not only the vector control but also other closed-loop control. The rotational speed is expressed by the number of revolutions (rpm) at which a rotor rotates per unit time (for example, one minute) or the number of revolutions (rps) at which the rotor rotates per unit time (for example, one second). The vector control is a method in which current flowing through the motor is separated into a current component that contributes to generation of a torque and a current component that contributes to generation of a magnetic flux, and the current components orthogonal to each other are independently controlled.

The power supply circuit 111 is connected to an external power supply (not illustrated) and generates a DC voltage (for example, 3 V or 5 V) required for each block in the circuit.

The angle sensor 112 is, for example, a resolver or a Hall IC. Alternatively, the angle sensor 112 is also realized by a combination of an MR sensor having a magnetoresistive (MR) element and a sensor magnet. The angle sensor 112 detects the rotation angle of the rotor and outputs the rotation angle of the rotor to the processor 200. The control device 100 may include a speed sensor and an acceleration sensor for detecting the rotational speed and acceleration of the motor instead of the angle sensor 112.

The input circuit 113 receives a motor current value (hereinafter, referred to as an "actual current value") detected by a current sensor (not illustrated), converts a level of the actual current value into an input level for the processor 200 as needed, and outputs the actual current value to the processor 200. A typical example of the input circuit 113 is an analog-digital conversion circuit.

The processor 200 is a semiconductor integrated circuit and is also referred to as a central processing unit (CPU) or a microprocessor. The processor 200 sequentially executes a computer program that is stored in the ROM 116, which is an example of a memory, and describes a command set for controlling motor driving, and realizes desired processing. The processor 200 is widely interpreted as a term including a field programmable gate array (FPGA), an application specific integrated circuit (ASIC), or an application specific standard product (ASSP) equipped with a CPU. The processor 200 sets a target current value in accordance with, for example, the actual current value and the rotation angle of the rotor to generate a PWM signal, and outputs the PWM signal to the drive circuit 115.

The communication I/F 114 is an input/output interface configured to transmit and receive data in conformity with an in-vehicle control area network (CAN), for example.

The drive circuit 115 is typically a gate driver (or a pre-driver). The drive circuit 115 generates a gate control signal in accordance with the PWM signal and gives the gate control signal to gates of the plurality of switch elements included in the inverter 545. There is a case where a gate driver is not necessarily required when a driving target is a motor that can be driven at a low voltage. In this case, the processor 200 may have the function of the gate driver.

The ROM 116 is electrically connected to the processor 200. The ROM 116 is a writable memory (for example, a PROM), a rewritable memory (for example, a flash memory or an EEPROM), or a read-only memory, for example. The ROM 116 stores a control program including a command set for causing the processor 200 to control motor driving. For example, the control program is temporarily expanded in a RAM (not illustrated) at the time of booting.

Figure 3:
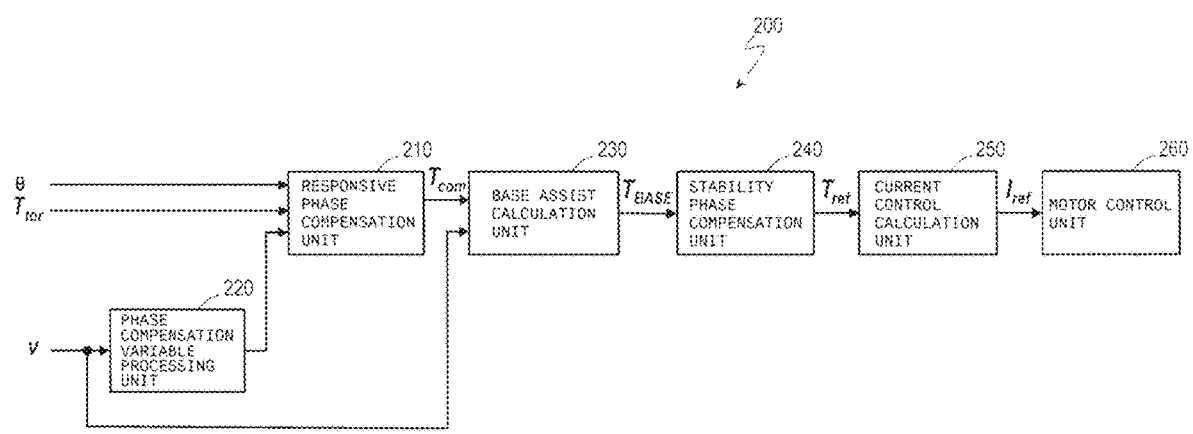
FIG. 3 is a functional block diagram illustrating, on a functional block basis, functions of a processor according to the present example embodiment.

FIG. 3 is a functional block diagram illustrating functions implemented in the processor 200 in functional block units. In the present specification, the processor 200 includes a responsiveness phase compensation unit 210, a phase compensation variable processing unit 220, a base assist calculation unit 230, a stability phase compensation unit 240, a current control calculation unit 250, and a motor control unit 260. Typically, the processes (or the tasks) of the functional blocks corresponding to the respective units are described in the computer program on a software module basis, and are stored in the ROM 116. However, in a case where an FPGA or the like is used, all or some of the functional blocks may be implemented as hardware accelerators.

In a case in which each functional block is implemented as software (or firmware) in the control device 100, a device that executes the software may be the processor 200. In one aspect, the control device according to the present disclosure includes the processor and a memory that stores a program that controls the operation of the processor. The processor executes the following processing in accordance with the program. (1) A steering torque detected by the steering torque sensor and a vehicle speed detected by the vehicle speed sensor are acquired. (2) A gain and a phase to be applied to the steering torque are changed in accordance with a steering frequency when the driver steers the steering wheel. (3) The magnitude of an assist torque is determined based on the steering torque to which the gain and the phase have been applied and the vehicle speed. (4) A torque command value to be used to control driving of the motor is generated based on the determined assist torque.

The processor 200 acquires, as inputs, the steering torque $T_{tor}$ detected by the steering torque sensor 541, the vehicle speed v detected by the vehicle speed sensor, the steering angle θ detected by the steering angle sensor, and a rotational speed ω of the motor. For example, in a case where the control device 100 includes a speed sensor that detects a rotational speed of the motor, the processor 200 can acquire the rotational speed ω of the motor by acquiring the detected rotational speed from the speed sensor. In a case where the control device 100 includes an angle sensor that detects a rotation angle (more specifically, a mechanical angle) of the rotor, the processor 200 can acquire the rotational speed ω by acquiring the detected rotation angle of the rotor from the angle sensor and calculating an angular speed based on the rotation angle of the rotor.

Figure 5:
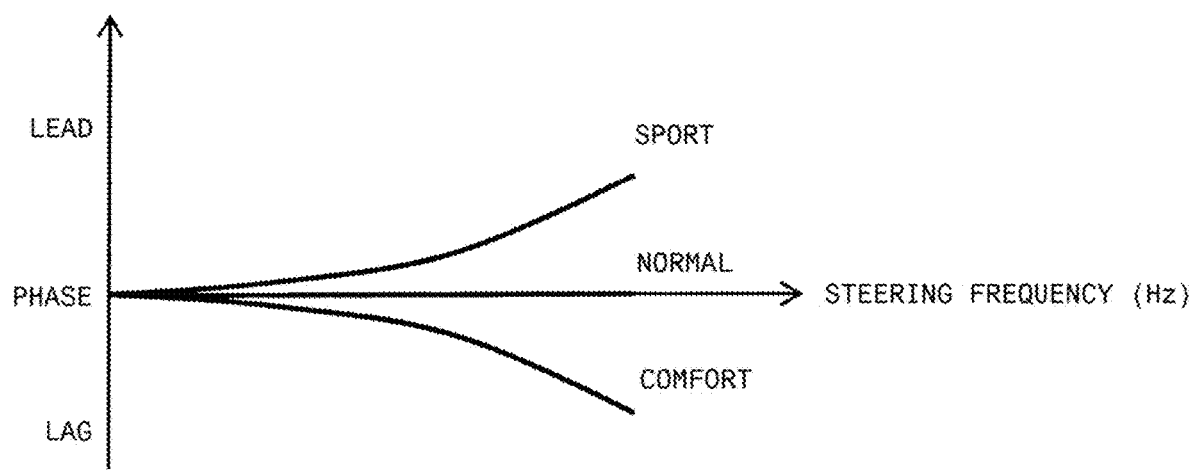
FIG. 5 is a graph illustrating control to change a phase in accordance with a steering frequency according to an example embodiment of the present disclosure.
Figure 6:
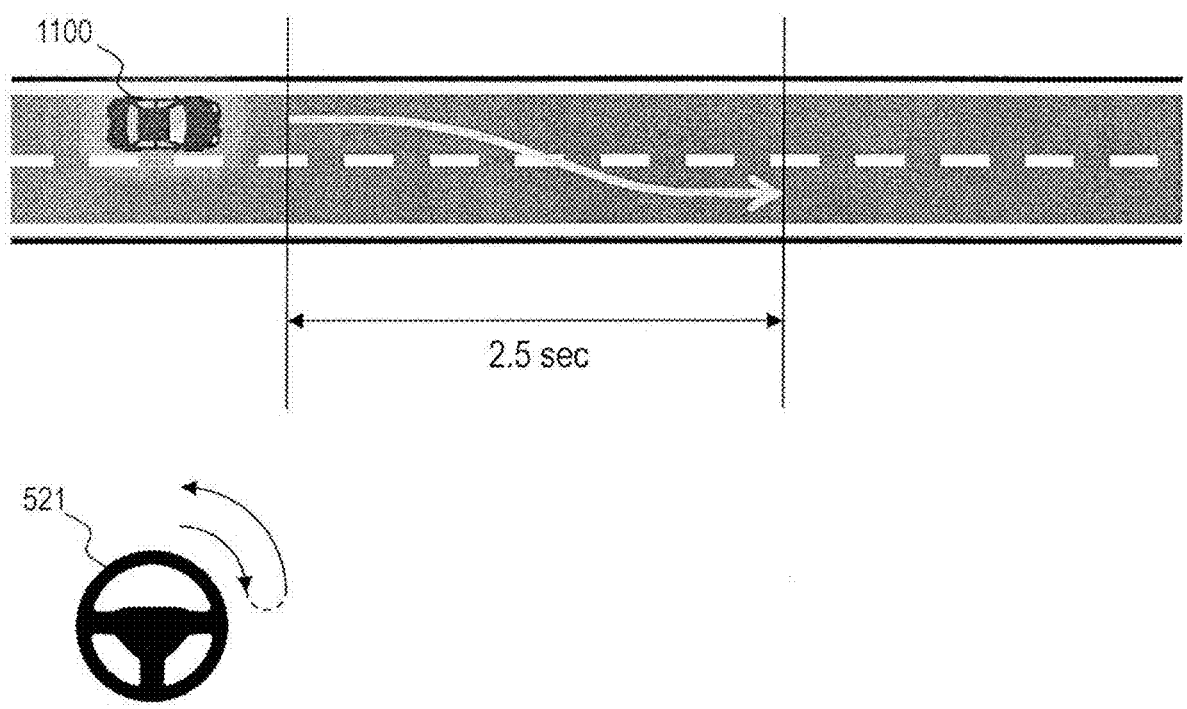
FIG. 6 is a view describing a steering frequency according to an example embodiment of the present disclosure.

Control for changing the gain and the phase in accordance with the steering frequency according to the present example embodiment will be described with reference to FIGS. 4, 5, and 6.

Figure 4:
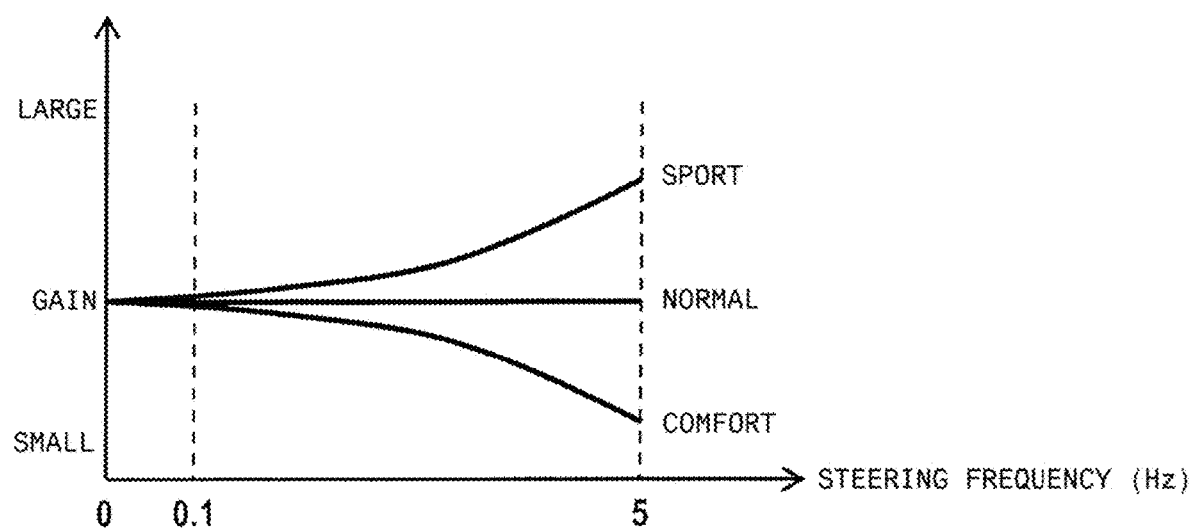
FIG. 4 is a graph illustrating control to change a gain in accordance with a steering frequency according to an example embodiment of the present disclosure.

FIG. 4 is a graph illustrating control for changing the gain in accordance with the steering frequency. FIG. 5 is a graph illustrating control for changing the phase in accordance with the steering frequency. FIG. 6 is a view for describing the steering frequency. In the present example embodiment, the gain and the phase to be applied to the steering torque are changed in accordance with the steering frequency when the driver steers the steering wheel 521.

The steering frequency will be described with reference to FIG. 6. FIG. 6 illustrates an automobile 1100 that changes lanes while traveling on a road and how the steering wheel 521 is operated at that time. The steering frequency is a frequency corresponding to a steering speed. For example, in a case where the lane is changed from the left lane to the right lane as illustrated in FIG. 6, the steering wheel 521 is rotated to the right and then rotated to the left to return to the neutral position. Such an operation of turning the steering wheel 521 from the neutral position in one direction and returning the steering wheel to the neutral position again corresponds to a half cycle. In a case where the operation for the half cycle takes 2.5 seconds, one cycle takes 5.0 seconds, and the steering frequency is 0.2 Hz.

In the present example embodiment, for example, when a condition that the steering frequency is 0.1 to 5.0 Hz is satisfied, control is performed to change the gain and the phase in accordance with the steering frequency. Note that control for changing the gain and the phase in accordance with the steering frequency may be similarly performed even when the steering frequency is other than the above.

The automobile on which the electric power steering apparatus 1000 of the present example embodiment is mounted can set a plurality of types of travel modes. As an example, the plurality of types of travel modes include a sport mode, a comfort mode, and a normal mode. The types and number of travel modes are arbitrary, and the present example embodiment is not limited thereto.

The processor 200 performs control to change a steering feeling of the steering wheel 521 in accordance with a type of a travel mode selected by the driver. For example, in a case where the sport mode is selected, a steering feeling that reacts quickly although a steering load is heavy is provided to the driver. In addition, for example, in a case where the comfort mode is selected, a steering feeling that reacts gently although a steering load is light is provided to the driver.

In FIG. 4, the vertical axis represents the gain, and the horizontal axis represents the steering frequency. In FIG. 5, the vertical axis represents the phase, and the horizontal axis represents the steering frequency. The processor 200 varies the degree of changing each of the gain and the phase in accordance with the steering frequency depending on the type of the travel mode selected by the driver. For example, in the case where the sport mode is selected, the processor 200 performs control to increase the gain and lead the phase as the steering frequency increases. On the other hand, in the case where the comfort mode is selected, the processor 200 performs control to decrease the gain and delay the phase as the steering frequency increases. As a result, a desired steering feeling in accordance with the travel mode is provided to the driver.

Referring again to FIG. 3, the responsiveness phase compensation unit 210 acquires, as inputs, the steering torque $T_{tor}$, the steering angle θ, and an output signal of the phase compensation variable processing unit 220. The responsiveness phase compensation unit 210 adjusts the assist gain within a possible range of the steering frequency (for example, 0.1 to 5.0 Hz) to compensate for the rigidity of the torsion bar 546. For example, the responsiveness phase compensation unit 210 calculates first-order phase compensation represented by the following (Formula 1) and applies the first-order phase compensation to the steering torque $T_{tor}$.

[Expression 1]

$$C(s) = \frac{\frac{1}{\omega_1}s + 1}{\frac{1}{\omega_2}s + 1} \quad \text{(Formula 1)}$$

$$\omega_1 = \frac{1}{2\pi f_1} \quad \omega_2 = \frac{1}{2\pi f_2}$$

Here, $f_1$ is a frequency of the zero point, and $f_2$ is a frequency of the pole. A Laplace operator is represented by s. The responsiveness phase compensation unit 210 changes the gain and the phase using the calculated first-order compensation C(s).

The phase compensation variable processing unit 220 acquires the vehicle speed v as an input. The phase compensation variable processing unit 220 changes values of the frequency $f_1$ of the zero point and the frequency $f_2$ of the pole in accordance with the vehicle speed v. For example, the ROM 116 stores a lookup table that defines a relationship among the vehicle speed v, the frequency $f_1$ of the zero point, and the frequency $f_2$ of the pole. The lookup table changes the values of the frequency $f_1$ of the zero point and the frequency $f_2$ of the pole in accordance with the vehicle speed v. For example, the value of the frequency $f_1$ of the zero point and the value of the frequency $f_2$ of the pole are set to lower values as the value of the vehicle speed v increases.

The phase compensation variable processing unit 220 outputs the changed values of the frequency $f_1$ of the zero point and the frequency $f_2$ of the pole to the responsiveness phase compensation unit 210. The responsiveness phase compensation unit 210 performs the calculation of the above (Formula 1) using the acquired values of the frequency $f_1$ of the zero point and the frequency $f_2$ of the pole. As a result, the magnitude of the first-order compensation C(s) changes in accordance with the vehicle speed v.

For example, the assist gain increases in a frequency band in which the phase leads by performing phase lead compensation, so that the torsion of the torsion bar 546 decreases, and the rigidity of the torsion bar 546 can be increased. In addition, the assist gain decreases in a frequency band in which the phase is delayed by performing phase lag compensation, so that the torsion of the torsion bar 546 increases, and the rigidity of the torsion bar 546 can be reduced.

In addition, the responsiveness phase compensation unit 210 calculates the steering frequency from a change in the magnitude of the acquired steering angle θ. The responsiveness phase compensation unit 210 varies the degree of changing each of the gain and the phase in accordance with the steering frequency depending on the type of the travel mode selected by the driver as described with reference to FIGS. 4 and 5. For example, in the case where the sport mode is selected, the responsiveness phase compensation unit 210 increases the gain and leads the phase as the steering frequency increases. On the other hand, in the case where the comfort mode is selected, the responsiveness phase compensation unit 210 decreases the gain and delays the phase as the steering frequency increases. In the normal mode, such gain and phase adjustment is not performed, and predetermined gain and phase compensation are adopted.

For example, the ROM 116 stores a plurality of types of lookup tables each having a different content per travel mode and defining a relationship among the steering frequency, the gain, and the phase. The responsiveness phase compensation unit 210 changes the gain and the phase using a lookup table depending on the selected travel mode.

The responsiveness phase compensation unit 210 applies adopted gain and phase compensation to the steering torque $T_{tor}$ to generate a steering torque $T_{com}$. The responsiveness phase compensation unit 210 outputs the steering torque $T_{com}$ to the base assist calculation unit 230.

The base assist calculation unit 230 calculates an assist amount serving as a base for reducing a steering driving load on the driver based on the phase-compensated steering torque $T_{com}$ and the vehicle speed v. The base assist calculation unit 230 acquires the steering torque $T_{com}$ and the vehicle speed v as inputs, and generates and outputs a base assist torque $T_{BASE}$ based on these signals.

In addition, the ROM 116 also stores a lookup table that defines a relationship among the steering torque $T_{com}$, the vehicle speed v, and the base assist torque $T_{BASE}$. The base assist calculation unit 230 determines the base assist torque $T_{BASE}$ using such a lookup table.

The stability phase compensation unit 240 acquires the base assist torque $T_{BASE}$ as an input. The stability phase compensation unit 240 ensures a phase margin near a gain crossover frequency by the phase lead compensation in order to ensure stability with respect to a base assist gain. The stability phase compensation unit 240 performs stabilization compensation on the base assist torque $T_{BASE}$ to generate a stabilization compensation torque. The stability phase compensation unit 240 outputs the stabilization compensation torque as a torque command value $T_{ref}$.

The current control calculation unit 250 generates a current command value $I_{ref}$ based on the torque command value $T_{ref}$. The motor control unit 260 sets a target current value based on the current command value $I_{ref}$ by vector control, for example, to generate a PWM signal and outputs the PWM signal to the drive circuit 115.

Through the control as described above, for example, heavy and quick steering characteristics of the sport mode can be realized. In addition, for example, light and gentle steering characteristics of the comfort mode can be realized.

Figure 7:
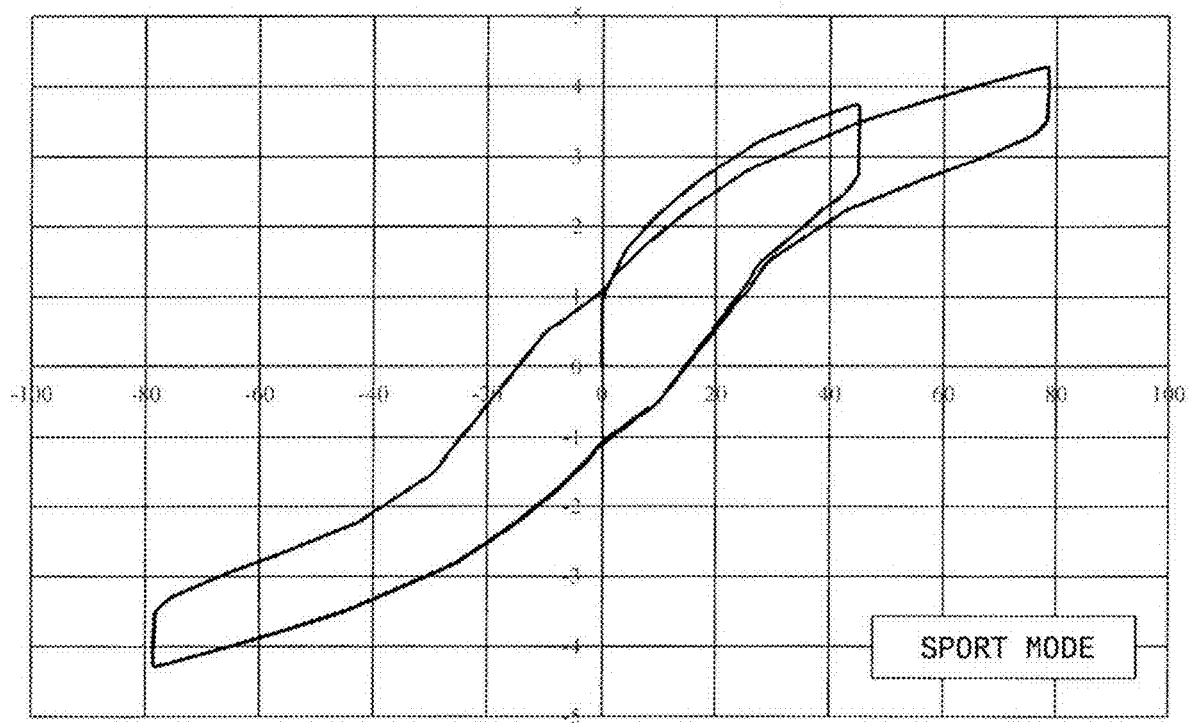
FIG. 7 is a graph illustrating a waveform of a steering characteristic as a simulation result according to an example embodiment of the present disclosure.
Figure 8:
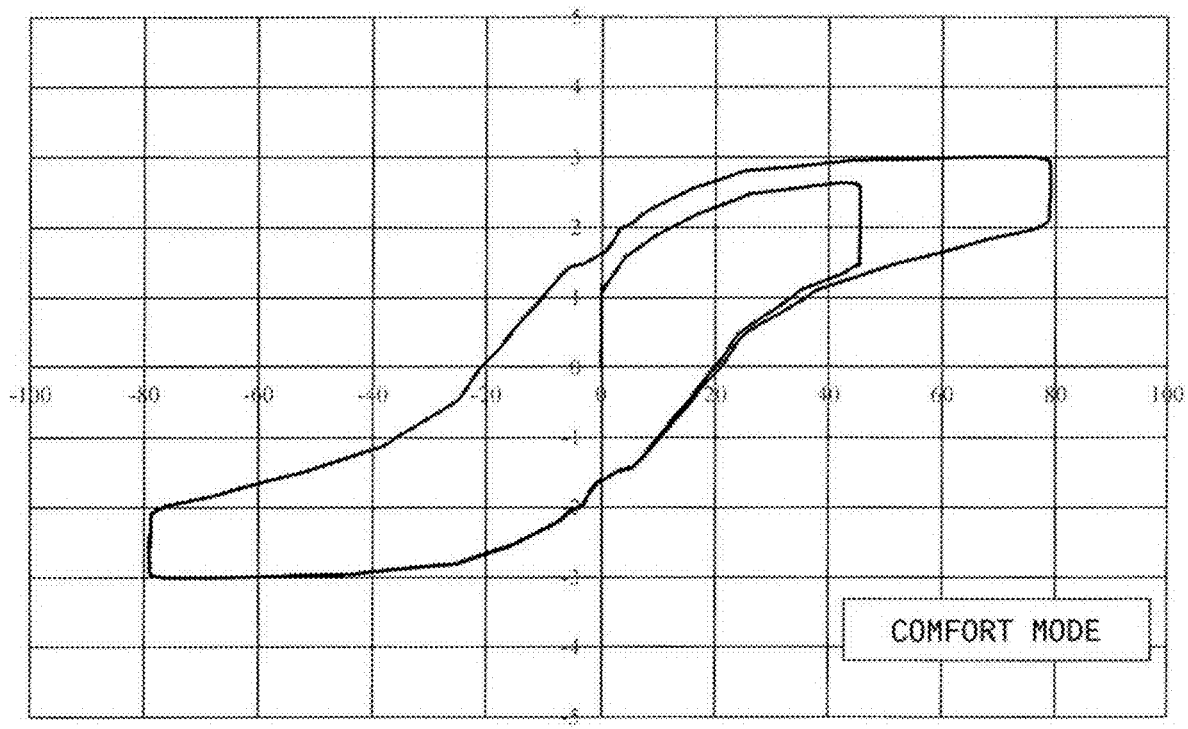
FIG. 8 is a graph illustrating a waveform of a steering characteristic as a simulation result according to an example embodiment of the present disclosure.
Figure 9:
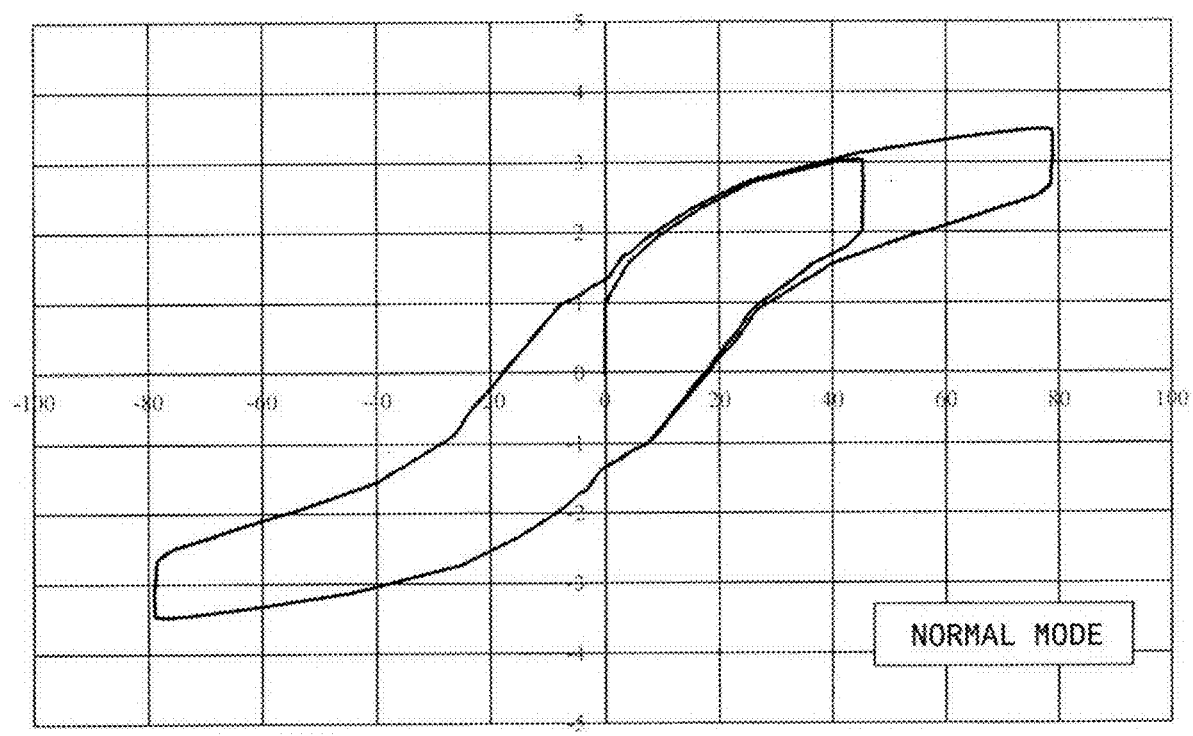
FIG. 9 is a graph illustrating a waveform of a steering characteristic as a simulation result according to an example embodiment of the present disclosure.

The inventor of the present disclosure has verified the validity of the control device 100 according to the present example embodiment by simulation. FIGS. 7, 8, and 9 illustrate graphs of steering characteristics as simulation results. FIG. 7 illustrates the simulation result in the sport mode. FIG. 8 illustrates the simulation result in the comfort mode. FIG. 9 illustrates the simulation result in the normal mode.

As simulation conditions, the steering angle θ was set to ±80 [deg], and the steering frequency was set to 0.25 [Hz]. In addition, the frequency $f_1$ of the zero point and the frequency $f_2$ of the pole in the comfort mode were set to 0.7 [Hz] and 0.5 [Hz], respectively. The frequency $f_1$ of the zero point and the frequency $f_2$ of the pole in the sport mode were set to 0.5 [Hz] and 0.7 [Hz], respectively. In the normal mode, the first-order compensation as described above was not applied.

In each of FIGS. 7, 8, and 9, the vertical axis represents the steering torque [N·m], and the horizontal axis represents the steering angle [deg].

Referring to angular force Lissajous waveforms illustrated in FIGS. 7, 8, and 9, it can be seen that the steering torque in the sport mode is larger than that in the normal mode, and an inclination of the steering torque with respect to the steering angle is steep. It can be seen that the heavy and quick steering characteristics can be realized in the sport mode of the present example embodiment. It can be seen that the steering torque in the comfort mode is smaller than that in the normal mode, and an inclination of the steering torque with respect to the steering angle is gentle. It can be seen that the light and gentle steering characteristics can be realized in the comfort mode of the present example embodiment.

Example embodiments of the present disclosure may be applicable to a control device for controlling an electric power steering apparatus mounted in a vehicle.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device usable in an electric power steering apparatus including a motor to control driving of the motor, the control device comprising:
a processor; and
a memory to store a program to control an operation of the processor; wherein
the program when executed by the processor causes the processor to:
acquire a steering torque detected by a steering torque sensor and a vehicle speed detected by a vehicle speed sensor;
change a gain and a phase to be applied to the steering torque in accordance with a steering frequency when a driver steers a steering wheel;
determine a magnitude of an assist torque based on the steering torque to which the gain and the phase have been applied and the vehicle speed; and
generate a torque command value to be used to control driving of the motor based on the determined assist torque;
a vehicle on which the electric power steering apparatus is mounted allows settings of different types of travel modes; and
the processor is programmed to perform control to vary each degree of change in the gain and the phase in accordance with the steering frequency depending on one of the types of the travel modes selected by the driver.

2. The control device according to claim 1, wherein the types of travel modes include a first travel mode and a second travel mode; and the processor is programmed to:
perform control to increase the gain and lead the phase as the steering frequency increases when the first travel mode is selected; and
perform control to reduce the gain and delay the phase as the steering frequency increases when the second travel mode is selected.

3. The control device according to claim 1, wherein when $f_1$ is a frequency of a zero point and $f_2$ is a frequency of a pole, the processor is programmed to calculate first-order compensation ($C(s)$) in accordance with:

$$C(s) = \frac{\frac{1}{\omega_1}s + 1}{\frac{1}{\omega_2}s + 1}$$

$$\omega_1 = \frac{1}{2\pi f_1} \quad \omega_2 = \frac{1}{2\pi f_2};$$

and
change the gain and the phase using the first-order compensation $C(s)$.

4. The control device according to claim 3, wherein the processor is programmed to change values of the frequency $f_1$ of the zero point and the frequency $f_2$ of the pole in accordance with the vehicle speed.

5. The control device according to claim 3, wherein the processor is programmed to change values of the frequency $f_1$ of the zero point and the frequency $f_2$ of the pole in accordance with the vehicle speed using a table that defines a relationship among the vehicle speed, the frequency $f_1$ of the zero point, and the frequency $f_2$ of the pole.

6. The control device according to claim 1, wherein the processor is programmed to perform control to change the gain and the phase in accordance with the steering frequency when the steering frequency is about 0.1 to about 5.0 Hz.

7. The control device according to claim 1, wherein the processor is programmed to perform stabilization compensation on the determined assist torque to generate a stabilization compensation torque.

8. An electric power steering apparatus comprising:
a motor;
a steering torque sensor; and
the control device according to claim 1.

9. A control method, usable in an electric power steering apparatus including a motor to control driving of the motor, the control method comprising:
acquiring a steering torque detected by a steering torque sensor and a vehicle speed detected by a vehicle speed sensor;
changing a gain and a phase to be applied to the steering torque in accordance with a steering frequency when a driver steers a steering wheel;
determining a magnitude of an assist torque based on the steering torque to which the gain and the phase have been applied and the vehicle speed; and
generating a torque command value to be used to control driving of the motor based on the determined assist torque; wherein
a vehicle on which the electric power steering apparatus is mounted allows settings of different types of travel modes; and
the control method performs control to vary each degree of change in the gain and the phase in accordance with the steering frequency depending on one of the types of the travel modes selected by the driver.

* * * * *